Dec. 8, 1964      F. P. BEGUIN      3,160,717
EAR PROTECTORS

Filed March 21, 1962      3 Sheets-Sheet 1

INVENTORS
FRED P. BEGUIN
BY Louis L. Gagnon
James P. McAndrews
ATTORNEYS

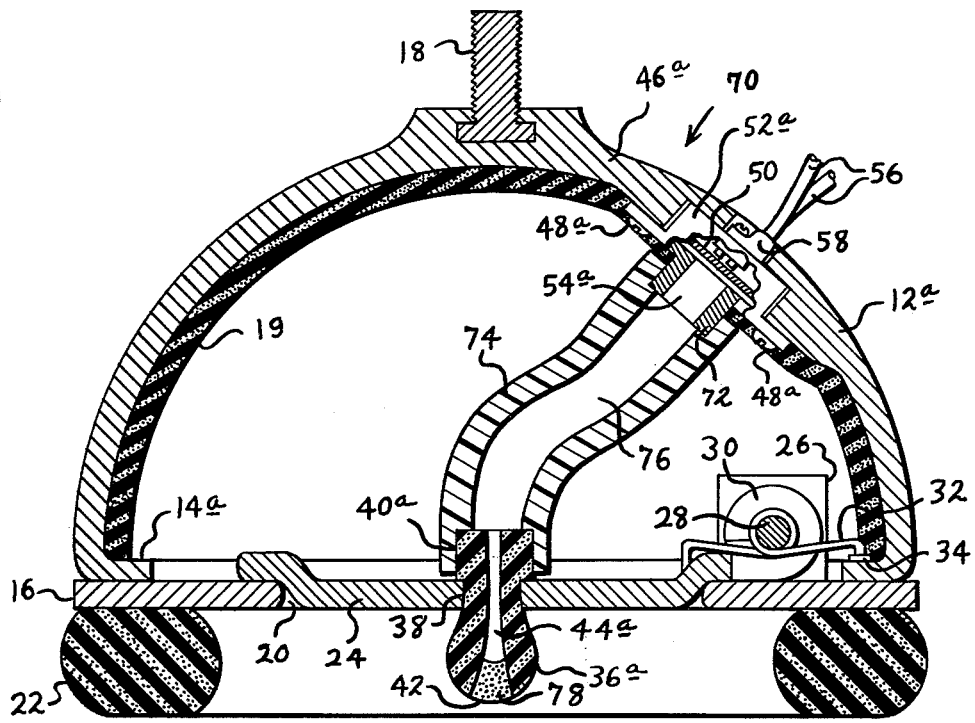
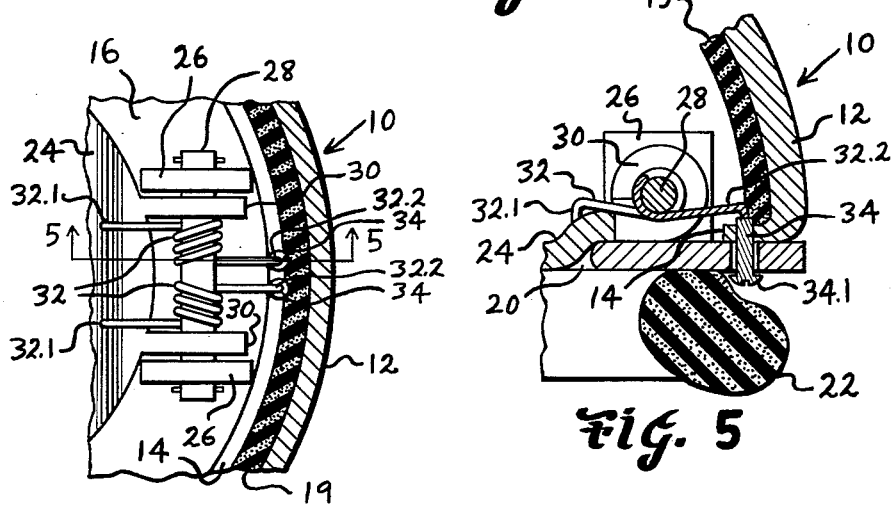

INVENTORS
FRED P. BEGUIN
ATTORNEYS

United States Patent Office 3,160,717
Patented Dec. 8, 1964

3,160,717
EAR PROTECTORS
Fred P. Beguin, Sturbridge, Mass., assignor to American Optical Company, Southbridge, Mass., a voluntary association of Massachusetts
Filed Mar. 21, 1962, Ser. No. 181,373
8 Claims. (Cl. 179—182)

The field of this invention is that of noise-attenuating ear-protectors, and the invention relates, more particularly, to novel and improved ear-protectors which incorporate earphones for receiving communications.

It is an object of this invention to provide novel and improved ear-protectors, and to provide such ear-protectors which can incorporate earphones for receiving communication. It is a further object of this invention to provide such ear-protectors which can achieve high attenuation of ambient noise; to provide such ear-protectors incorporating earphones which can effect improved acoustical coupling between said earphones and an ear; to provide such communications ear-protectors which can transmit aural communications to an ear with an improved signal-to-noise ratio; and to provide such communications ear-protectors which can transmit intelligible aural communications to an ear under conditions of extremely high ambient noise. It is also an object of this invention to provide such communications ear-protectors which can transmit sound signals produced by said earphones to an ear with improved fidelity.

It is another object of this invention to provide such ear-protectors which can be worn with improved comfort; and to provide such ear-protectors which can be worn without substantial risk of injury to the ear due to inadvertent snagging or bumping of the ear protector. It is a further object of this invention to provide such ear-protectors which can be conveniently kept free of dust, splash and other extraneous matter when not in use.

Briefly described, the ear-protector provided by this invention comprises a noise-attenuating cup or enclosure means having an aperture adapted to fit around an ear for enclosing the auricle of the ear within the cup or enclosure means, the cup being adapted to be manually supported in ear-protecting relation or to be supported in said relation by means of conventional head-bands, helmets or the like. Preferably a cushion means is attached to the cup or enclosure means around said cup aperture for permitting comfortable sealing of the cup in substantially airtight relation against the head. In addition, a suitable closure means such as a hinged door is preferably mounted upon the noise-attenuating cup for movement between a position within the cup and a position closing the cup aperture, and biasing means such as suitable springs are provided for normally urging the closure means to the position closing the cup aperture. In this construction, the closure means will normally close the cup aperture when the ear-protector is not in use, but, when the ear-protector is to be used, the closure means can be conveniently pressed into the noise-attenuating cup for permitting the auricle of an ear to be received within the cup.

A transducer means such as a conventional earphone having a vibratory diaphragm or membrane for reproducing sound signals is preferably incorporated in the ear-protector of this invention, and a conduit means is provided for defining an airtight passage which extends away from the transducer diaphragm and which opens at one end in spaced relation to the transducer diaphragm. The open extending end of the conduit means is adapted to fit snugly into the ear-canal or closely around the opening of the ear-canal of an ear enclosed within the noise-attenuating cup, and at least the extending end of the conduit means is mounted for movement with the door or other closure means in such a manner that, when the ear-protector is in use, the means which normally bias the closure means to the position closing the cup aperture can urge the open extending end of the conduit means into cooperative relation with said ear-canal for coupling the ear-canal and said conduit passage in substantially airtight relation. In an alternative embodiment of the invention, an earplug can be mounted upon the door or other closure means so that, when the ear-protector is in use, the means which normally bias the closure means to the position closing the cup aperture can urge the earplug into cooperative relation with an ear-canal for achieving an improved degree of noise attenuation.

In this construction, the closure means incorporated in the ear-protector of this invention is normally biased to a position closing the cup aperature when the ear-protector is not in use and can thereby exclude dust, splash and other extraneous matter from within the ear-protector cup. However, when desired, the noise-attenuating cup can be comfortably fitted in airtight relation to the head around an ear and the closure means can be pressed into the cup by contact with the ear for permitting the auricle of the ear to extend into the cup through the cup aperture, hereby to substantially shield the ear from ambient noise. The earplug or the open extending end of the conduit means can then be biased snugly into the ear-canal or around the ear-canal opening by the means which normally urges the closure means to a position closing the cup aperture, for further excluding ambient noise from the ear-drum. In addition, biasing of said open conduit end into the ear-canal in an ear-protector incorporating an earphone or other transducer means serves to couple the conduit passage and the ear-canal in airtight relation for achieving tight acoustical coupling between the diaphragm of the transducer and the ear-drum. Preferably the means biasing the closure means to close the cup aperture or to urge the earplug or open extending end of the conduit means into cooperative relation with said ear-canal are adjustable, whereby the force with which said earplug or said open end of the conduit means is biased into coupled relation with an ear-canal can be comfortably regulated.

Other objects, advantages and details of the ear-protector of this invention appear in the following detailed description of preferred embodiments of the invention, the detailed description referring to the drawings in which:

FIG. 4 is a partial section view along line 4—4 of FIG. 3;

FIG. 5 is a partial section view along line 5—5 of FIG. 4;

FIG. 7 is a section view similar to FIG. 3 illustrating an alternative embodiment of the ear-protector of this invention.

Figure 1:
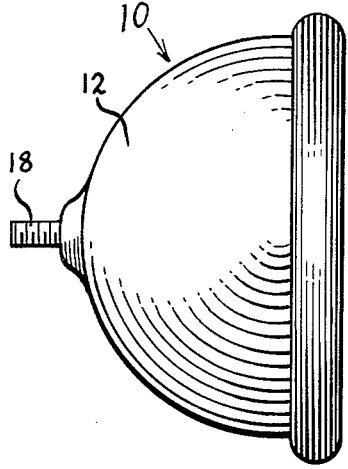
FIG. 1 is a front elevation view of the ear-protector provided by this invention.

Referring to the drawings, 10 indicates a preferred embodiment of the novel and improved ear-protector provided by this invention. As illustrated, the ear-protector 10 includes a noise-attenuating cup or enclosure means 12 having an inturned rim portion 14 which is attached by a suitable cement or other conventional means to a flange 16. The cup and flange can be formed of any suitable plastic material or the like and preferably the cup has a bolt 18 or other suitable means embedded therein or attached thereto by means of which the ear-protector can be conveniently mounted upon a conventional headband or the like. If desired, the noise-attenuating cup can be lined with any conventional sound-absorbing material 19 such as sponge rubber. The flange 16 has an aperture 20 which is of a size adapted to receive the auricle of an ear therein, and preferably a cushion member 22 of sponge rubber or other suitable cushioning material is cemented or otherwise attached to the flange 16 around the aperture 20 by means of which the ear-protector can be comfortably fitted in substantially airtight relation against the head around an ear.

Figure 3:
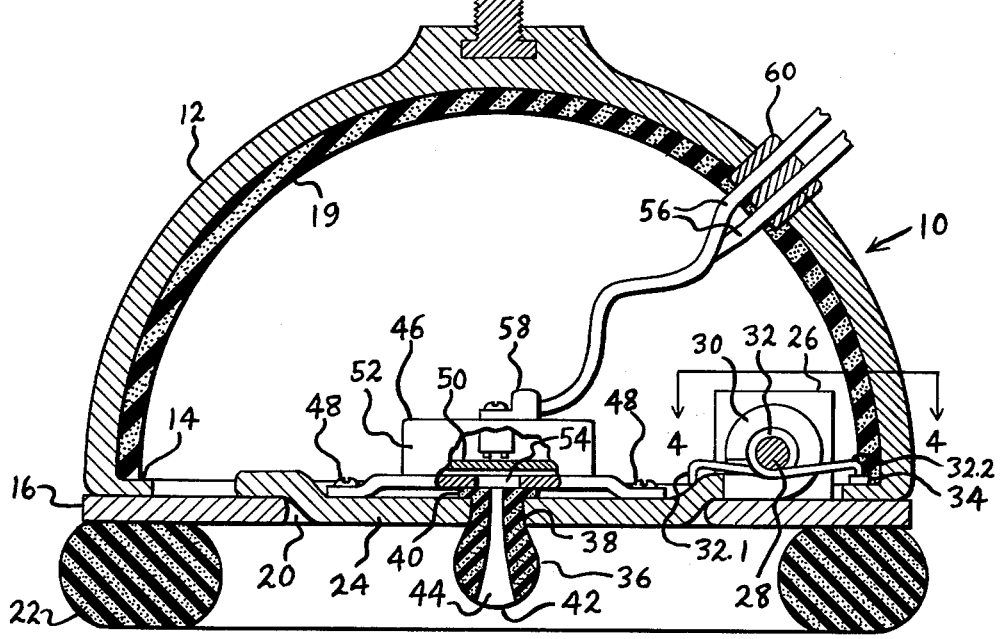
FIG. 3 is an enlarged section view along line 3—3 of FIG. 2.

According to this invention, a closure means such as the door 24 can be mounted upon the ear-protector 10 for movement between a position within the cup 12 and a position closing the cup aperture 20. For this purpose, as shown in FIGS. 3 and 4, a pair of bosses 26 can be attached to or formed integral with the flange 16 at one side of the aperture 20 and a pivot pin 28 can be mounted between the bosses in any conventional manner. The door 24 can then be provided with hinge portions 30 which can be fitted partially around the pin 28 so that the door can be pivotally moved from a position within the cup 12 to the position closing the cup aperture 20 as shown in FIG. 3. A pair of springs 32 can be mounted upon the pivot pin 28 and one end 32.1 of each spring can engage the door 24. The opposite end 32.2 of each spring can then engage the rim portion 14 or the flange 16 or the like, and the springs can be adapted for resiliently biasing the door to the position closing the aperture 20 as will be understood.

Preferably but not necessarily a pair of adjusting screws 34 can be threadedly engaged in the rim portion 14 of the cup 12 as shown in FIGS. 4 and 5 and the ends 32.2 of the springs can bear upon the ends of said screws. The heads 34.1 of the screws are preferably accessible from outside the ear-protector 10, and for this purpose, the cushion member 22 is preferably not attached to the flange 16 immediately adjacent to the screws. In this construction, the cushion member 22 will normally overlap the screw heads 34.1 so that the cup 12 can be comfortably fitted in airtight relation to the head around an ear. However, the cushion member can be conveniently pressed to one side of the screw heads 34.1 to permit access to the heads so that the screws can be advanced or retracted in the rim portion 14 for adjusting the force with which the springs 32 urge the door 24 to the position closing the aperture 20.

Figure 6:
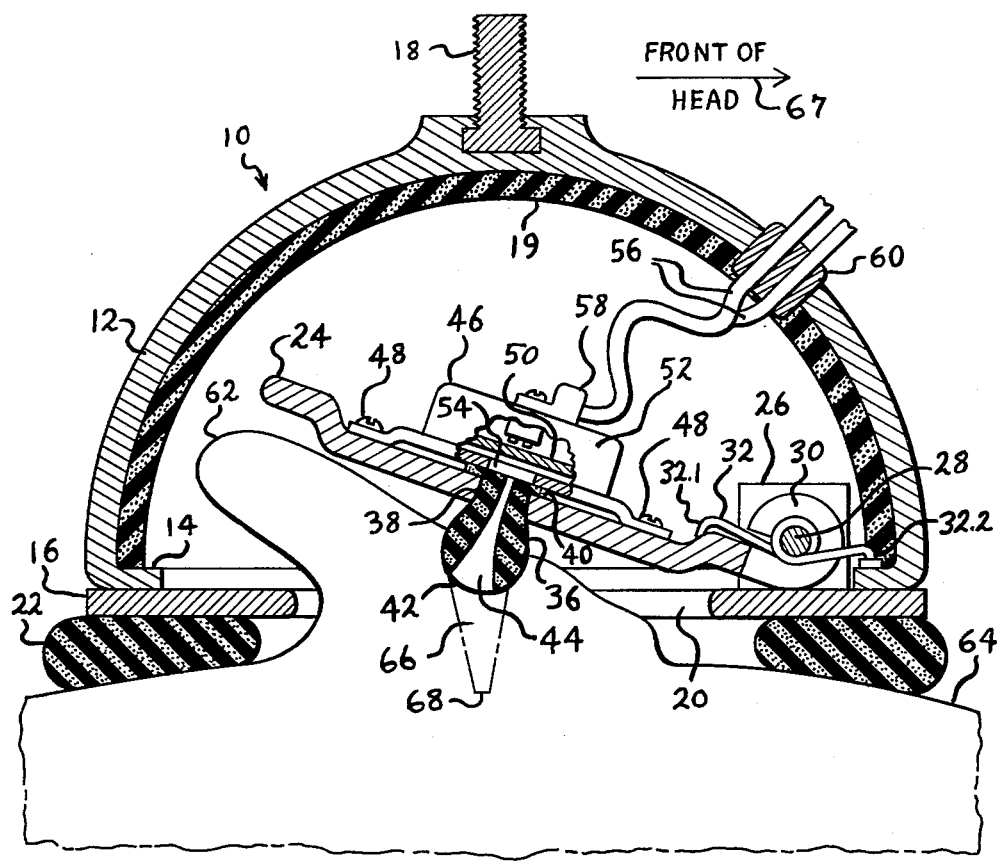
FIG. 6 is a section view similar to FIG. 3 illustrating use of the ear-protector.

In the embodiment of this invention illustrated in FIGS. 1–6, a conduit means 36 is mounted in an aperture 38 in the central part of the door 24, the conduit means comprising a flanged portion 40 at one end which fits flush with the interior side of the door around the door aperture, a central portion extending through an aperture in the door, and an opposite extending end portion 42 which is preferably shaped and proportioned as illustrated particularly in FIGS. 3 and 6 to fit snugly into the opening of an ear-canal of an ear brought adjacent to the door. The conduit means can be formed of metal or plastic or the like but is preferably formed of relatively firm sponge rubber so that the extending end thereof can fit snugly but comfortably into an ear-canal opening. If desired, however, the open end 42 of the conduit means can be proportioned to fit against the ear around the ear-canal opening or in other cooperative relation with the ear-canal for coupling the conduit passage and the ear-canal in airtight relation. The conduit means is provided with a through passage 44 which preferably flares to an increasingly large size substantially matching the size of an ear-canal opening at the extending end 42 of the conduit means as shown in FIG. 3.

A conventional transducer means or earphone 46 can be mounted upon the interior side of the door 24 by screws 48 or other suitable means, the transducer means including a conventional vibratory diaphragm or membrane 50 which is adapted to vibrate in response to electrical signals for reproducing sound signals. The transducer means can be enclosed in a casing 52 having an opening 54 or can be otherwise adapted in a suitable manner so that the transducer means can be mounted upon the door 24 with the casing bearing upon the flange portion 40 of the conduit means and with the casing opening 54 aligned with the conduit passage 44, whereby the conduit means passage 44 can define an airtight passage extending away from the transducer diaphragm. It should be understood that the transducer means could also be provided with similar conduit means and could be mounted upon the exterior side of the door 24 if desired.

The transducer means can be connected in an electrical communications circuit by means of the flexible leads 56, the leads being connected to the transducer means by the terminals 58 and extending exteriorly of the noise-attenuating cup 12 through the cup-sealing collar 60. Since the transducer means or earphone 46 is otherwise conventional, it will not be further described herein, it being understood that the transducer diaphragm 50 can be vibrated in response to electrical signals received through the leads 56 for reproducing and directing sound signals through the conduit passage 44.

Figure 2:
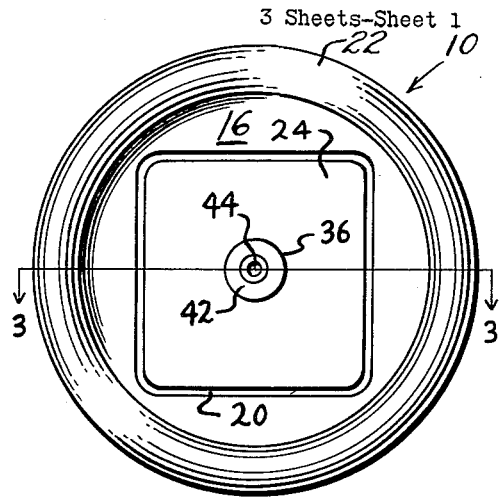
FIG. 2 is a side elevation view of the ear-protector.

In this construction, the ear-protector 10 is adapted to substantially exclude dust, splash and other extraneous material from entering the ear-protector when the device is not in use. That is, when the ear-protector is not in use, as is illustrated in FIG. 3, the spring means 32 will bias the door 24 to a position closing the cup aperture 20, thereby preventing dust and splash from contaminating the ear-protector liner 19. The conduit passage 44 which is open at the extending end 42 of the conduit means will be relatively very small as illustrated in FIG. 2 so that there will be little or no tendency for dust or splash to enter that passage.

On the other hand, when the ear-protector is to be used, the ear-protector can be fitted around an ear 62 as is diagrammatically illustrated in FIG. 6 so that the door 24 or other closure means can be pressed into the cup 12 against the bias of the springs 32 when contacted by the ear 62. The auricle of the ear 62 can fit comfortably within the cup 12 through the aperture 20 and the cushion members 22 can fit comfortably against the head 64 in substantially airtight relation thereto, thereby to substantially exclude ambient noise from the ear. Further, only slight adjusting movement of the ear-protector will be required for nestling the open extending end 42 of the transducer conduit means snugly into the ear-canal 66 or against the ear around the ear-canal opening and the springs 32 acting through the door 24 will hold the open conduit end 42 in the desired positioned relation to the ear-canal for coupling the conduit passage and the ear-canal in airtight relation. As illustrated in FIG. 6 by the arrow 67, the ear-protector is preferably positioned around the ear 62 so that the pivot pin 28 is located in vertically extending disposition at the side of the ear toward the front of the head, whereby the open conduit end 42 can fit comfortably into the ear-canal or against the ear around the ear-canal opening. As will be understood, the coupling of the conduit passage and the ear-canal in airtight relation will provide very tight acoustical coupling between the transducer diaphragm 50 and the ear-drum 68 and will further exclude ambient noise from the ear-drum. That is, the coupling of the conduit passage 44 and the ear-canal 66 in airtight relation can provide relatively high acoustic pressure upon the ear-drum 68, whereby the aural signal produced by the earphone 46 can be transmitted to the ear-drum without significant power loss. The double exclusion of ambient noise from the ear-drum achieved by the airtight seals formed by the cushion member 22 and by the extending end 42 of the transducer conduit means, in conjunction with the high acoustic pressure achieved by the very tight acoustical coupling of the transducer diaphragm and the ear-drum permits the ear-protector of this invention to achieve very high noise-attenuation and very desirable signal-to-noise ratios, and permits use of the ear-protector for the reception of intelligible aural communications under very high ambient noise levels. Further, it is well known that small air leaks and the like between a vibratory diaphragm and an ear-drum are usually frequently discriminatory so that sound vibrations of different wavelengths will not be transmitted with complete fidelity in an acoustical system having such leaks. In the ear-protector of this invention, the airtight coupling of the transducer conduit passage and the ear-canal 66 provide very tight acoustical coupling of the transducer diaphragm and the ear-drum and permit transmission of aural communications from the transducer to the ear with substantially complete fidelity.

A most important aspect of this invention is that the means biasing the open extending end 42 of the transducer conduit means into the ear-canal 66 are entirely independent of the force with which the ear-protector 10 is held against the head 64. That is, the ear-protector 10 can be mounted upon any conventional head-band (not shown), and can be held against the head by the head-band in conventional manner with whatever force is required for holding the ear-protector and head-band in the desired position on the head. However, the force with which the open conduit end 42 is urged into the ear-canal 66 or against the ear around the ear-canal opening will be dependent only upon the force applied to the door 24 by the springs 32 and will usually be substantially less than the force applied by the head-band. Further, as has been previously noted, the screws 34 can be conveniently adjusted for comfortably regulating the force exerted by the springs 32. This means that the force exerted by the springs 32 for achieving the desired degree of acoustical coupling can be relatively light, whereby, if the ear-protector and the ear-protector head-band are dislodged from their positions on the head by an inadvertent snagging or bumping of the ear-protector, the open conduit end 42 can be pulled from the ear or ear-canal without risk of injury to the ear.

An important alternative embodiment of the ear-protector of this invention is indicated at 70 in FIG. 7, the features of this embodiment which are similar to those of the ear-protector 10 being identified by corresponding numerals. In this embodiment of the invention, the conduit means 36a mounted upon the door 24 has a bushing portion 40a at one end but otherwise substantially corresponds to the conduit means 36 described with reference to FIGS. 1–6. The transducer means 46a can be mounted directly upon the cup 12a by means of screws 48a and the transducer casing 52a can be provided with a bushing portion 72 around the casing aperture 54a. The transducer means is shown mounted within the cup 12a but could also be mounted upon the exterior of the cup within the scope of this invention. A flexible tube member 74 of plastic or rubber material or the like can then be incorporated in the conduit means 36a and respective opposite ends of the tube can be fitted over the bushing portions 40a and 72 of the conduit means and transducer casing for defining an airtight passage 76 extending from transducer diaphragm 50 through the closure means 24. The tube 74 can be cemented or otherwise secured to said bushing portions in any conventional manner. Preferably but not necessarily a member 78 can be secured within the passage 44a, said member being of an open-cell, porous, foam material such as isocyanate foam or the like which is adapted to transmit sound waves without significant loss of intensity but which is adapted to substantially exclude dust, splash and other extraneous matter from entering the passage 44a. The ear-protector 70 will be otherwise similar to the ear-protector 10 previously described, it being understood that a member similar to the member 78 could be secured within the passage 44 of the ear-protector 10 if so desired.

In this construction, the ear-protector 70 can be used in the same manner as the ear-protector 10. However, the fixed mounting of the transducer means 46a upon the cup 12a will reduce any tendency of the closure means 24 to vibrate during use and will provide a more rugged and more effectively sound-proof ear-protector device. The member 78 will, of course, protect the passage 44a from dust and splash when the ear-protector is not in use.

Figure 8:
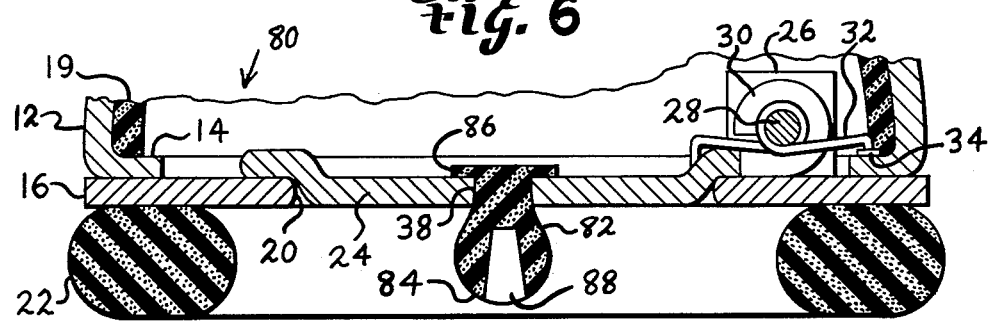
FIG. 8 is a partial section view similar to FIG. 3 illustrating another alternative embodiment of this invention.

Another alternative embodiment of this invention is indicated at 80 in FIG. 8, the features of this embodiment which are similar to those of the ear-protector 10 being identified by corresponding numerals. In this embodiment of the invention, a member 82, preferably having a general outer configuration similar to that of the conduit means 36 previously described, is mounted within the aperture 38 in the door 24 in the same manner as the conduit means 36 is mounted on the door 24 in the ear-protector 10, the ear-protector 80 being otherwise similar to the ear-protector 10. However, the member 82 can comprise an ear-plug or the like which is not provided with a sound-transmitting passage and can be provided with an end portion 84 adapted to fit snugly into an ear-canal opening and with a flange portion 86 adapted to hold the member within the door aperture 38. In this arrangement, the door 24 is adapted to be biased into a position closing the aperture 20 in flange 16 when the ear-protector 80 is not in use, thereby to exclude dust and splash and the like from the noise attenuating cup 12 of the ear-protector. However, when the ear-protector 80 is to be used, the door 24 can be pressed into the cup 12 by contact with an ear for receiving the auricle of the ear within the cup and for permitting the cushion member 22 to be fitted in airtight relation against the head for excluding ambient noise from the ear. The end 84 of the ear-plug member 82 can then be urged into the ear-canal of said ear or against the ear around the opening of the ear-canal by means which normally bias the door to the position closing the aperture 20, thereby to further exclude ambient noise from the ear as will be understood. If desired, the end 84 of the ear-plug can be recessed as at 88 for facilitating fitting of the ear-plug 84 into the opening of an ear-canal.

It should be understood that various embodiments of the ear-protector of this invention have been described above for the purpose of illustrating this invention but that many modifications of the described ear-protector structures are possible within the scope of this invention. For example, the pivotal mounting of the closure means 24 described above and the means suggested above for biasing the closure means to desired positions are not intended to limit the invention, and in fact many widely differing closure means and closure biasing means could be substituted for those which have been described by way of illustration. Further, some of the advantages of this invention can be achieved where the pivotally mounted means 24 of FIGS. 1 and 8 merely function to provide a resiliently-biased, movable support for the open extending end 42 of the conduit means or for the earplug 82 and where the means 24 does not serve to close an aperture such as the aperture 20 in the flange 16. That is, it is within the scope of this invention to include biasing means for urging the open extending end of the conduit means or the earplug into cooperative relation with the ear-canal of an ear enclosed by the ear-protector without also utilizing said biasing means for urging a closure means to a position closing the cup aperture. It should be understood that this invention includes all modifications and equivalents of the described ear-protectors which fall withing the scope of the appended claims.

Having described my invention, I claim:

1. A communications ear-protector comprising a noise-attenuating cup means having an aperture adapted to fit around an ear for enclosing the auricle of the ear within said cup means, cushion means attached to said cup means around said aperture for sealing said cup means in substantially airtight relation to the head when held against the head around an ear, transducer means having a vibratory diaphragm adapted for reproducing sound signals, conduit means defining an airtight passage which extends away from said transducer diaphragm and which opens at one end at a position spaced from said diaphragm, said conduit means having an extending portion at said open passage end adapted to fit into cooperative relation with an ear-canal for coupling said ear-canal and said passage in substantially airtight relation, means mounting said extending portion of said conduit means on said cup means for independent pivotal movement on said cup means toward and away from said ear, and means adapted to bias said mounting means for movement toward said ear for holding said extending portion of said conduit means in said coupled relation with the ear-canal of an ear with a force which is substantially independent of the force with which said cup means is held against the head.

2. An ear-protector comprising a noise-attenuating cup means having an aperture adapted to fit around an ear for enclosing the auricle of the ear within said cup means, cushion means attached to said cup means around said aperture for sealing said cup means in substantially airtight relation to the head when held against the head around an ear, a member attached to said cup means for independent pivotal movement toward and away from said ear, an earplug member having an end portion adapted to fit into an ear-canal for excluding ambient noise from said ear-canal, said earplug member being mounted on said pivotal member, and means adapted to bias said pivotal member for movement toward said ear to urge said end portion of said earplug member into the ear-canal of an ear with a force which is substantially independent of the force with which said cup means is held against the head.

3. A communications ear-protector comprising a noise-attenuating cup means having an aperture adapted to fit around an ear for enclosing the auricle of said ear within said cup means, cushion means attached to said cup means around said aperture for sealing said cup means in substantially airtight relation to the head around an ear, closure means mounted on said cup means for movement between a position within the cup means and a position closing said aperture, transducer means having a vibratory diaphragm adapted for reproducing sound signals, conduit means defining an airtight passage which extends away from said transducer diaphragm and which opens at one end at a position spaced from said diaphragm, said conduit means having an extending portion at said open passage end adapted to fit into cooperative relation with an ear-canal for coupling said ear-canal and said passage in substantially airtight relation, said extending portion of said conduit means being mounted for movement with said closure means, and means adapted to bias said closure means toward said position closing said aperture and to bias said extending portion of said conduit means into said coupled relation with the ear-canal of an ear enclosed by said cup means.

4. An ear-protector comprising a noise-attenuating cup means having an aperture adapted to fit around an ear for enclosing the auricle of said ear within said cup means, cushion means attached to said cup means around said aperture for sealing said cup means in substantially airtight relation to the head around an ear, closure means mounted on said cup means for movement between a position within the cup means and a position closing said aperture, an earplug member having an end portion adapted to fit into an ear-canal for excluding ambient noise from said air-canal, said earplug member being mounted for movement with said closure means, and means adapted to bias said closure means toward said position closing said aperture and to bias said end portion of said earplug member into the ear-canal of an ear enclosed by said cup means.

5. A communications ear-protector comprising a noise-attenuating cup having an aperture adapted to fit around an ear for enclosing the auricle of said ear within the cup, cushion means attached to said cup around said aperture for sealing the cup in substantially airtight relation to the head around an ear, a door mounted on said cup for movement between a position within the cup and a position closing said aperture, an earphone mounted on said door having a vibratory diaphragm adapted for reproducing sound signals, a conduit connected at one end to said earphone and having its opposite end mounted on the exterior of said door for defining an airtight passage which extends away from said earphone diaphragm and which opens at said opposite end, said opposite end of said conduit being adapted to fit into cooperative relation with an ear-canal for coupling said ear-canal and said passage in substantially airtight relation, and means adapted to resiliently bias said door toward said position closing said cup aperture and to bias said opposite end of said conduit into said coupled relation with the ear-canal of an ear enclosed by said cup.

6. A communications ear-protector comprising a noise-attenuating cup having an aperture adapted to fit around an ear for enclosing the auricle of said ear within the cup, cushion means attached to said cup around said aperture for sealing the cup in substantially airtight relation to the head around an ear, a door mounted on said cup for movement between a position within the cup and a position closing said aperture, an earphone mounted on said cup having a vibratory diaphragm adapted for reproducing sound signals, a conduit connected at one end to said earphone and having its opposite end mounted on the exterior of said door for movement with said door, said conduit defining an airtight passage which extends away from said earphone diaphragm and which opens at said opposite end, said opposite end of said conduit being adapted to fit into cooperative relation with an ear-canal for coupling said ear-canal and said passage in substantially airtight relation, and means adapted to resiliently bias said door toward said position closing said aperture and to bias said opposite end of said conduit into said coupled relation with the ear-canal of an ear enclosed by said cup.

7. A communications ear-protector as set forth in claim 5 having means for adjusting said biasing means to regulate the force with which said opposite end of the conduit is biased into said coupled relation with said ear-canal.

8. A communications ear-proctor as set forth in claim 6 having means for adjusting said biasing means to regulate the force with which said opposite end of the conduit is biased into said coupled relation with said ear-canal.

References Cited in the file of this patent

UNITED STATES PATENTS

| | | |
|---|---|---|
| 708,446 | Wile | Sept. 2, 1902 |
| 2,353,070 | Pitkin | July 4, 1944 |
| 2,447,470 | Valentine | Aug. 17, 1948 |